Figure 1:
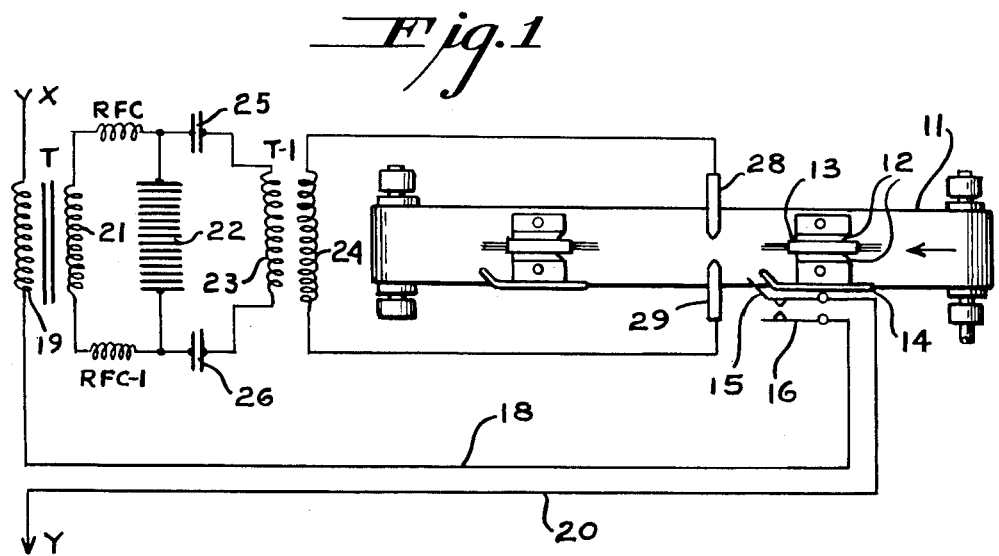

June 6, 1961  H. E. REXFORD  2,987,600
CAPACITOR EDGE SEALING
Filed March 11, 1959

INVENTOR.
HARRY E. REXFORD
BY Clarence R. Patty, Jr.
ATTORNEY

United States Patent Office 2,987,600
Patented June 6, 1961

2,987,600
CAPACITOR EDGE SEALING

Harry E. Rexford, Westfield, Pa., assignor to Corning Glass Works, Corning, N.Y., a corporation of New York Filed Mar. 11, 1959, Ser. No. 798,644
2 Claims. (Cl. 219—19)

The present invention relates to the manufacture of capacitors and particularly to capacitors of a type made by piling sheets of metallic foil into an assembly of laterally spaced stacks while vertically separating the sheets of the respective stacks with strips of glass, thus forming a laminated assembly; then heating the assembly to the softening temperature of the glass, pressing the same into a unitary bonded mass, and thereafter separating the respective stacks from one another by fracture of the glass along lines running transverse of the strip between the respective stacks. As an example of capacitor manufacture in the aforesaid manner, attention is directed to U.S. Patent No. 2,526,703, issued October 24, 1950, to G. P. Smith. Capacitors manufactured in the above fashion have the objection that they are not hermetically sealed along their severed edges, in that they often contain air lines between the edges of the metal foil sheets and the severed edge of the stack. Characteristically the foil sheets of such capacitors terminate quite near their severed edges and any method of effecting a seal therealong must be such as to avoid harm to such sheets and a resultant change in capacitance of the unit.

According to the invention the severed edge of such a capacitor can be electrically sealed by passing it between electrodes between which arcs are created which tend to pull into a horseshoe shape about the capacitor edge, imparting to the same a uniform homogeneous glazed-over hermetically sealed surface. Such an arc, according to the invention, is supplied from quenched gap oscillators generally operable at a frequency ranging from 200 to 600 kilocycles, depending upon the resonant frequency of the parallel tuned tank circuit employed. Since such oscillators produce damped waves, the arc formed between the electrodes under the influence of a load tends to extinguish and then re-ignite during each cycle of oscillation. The length of time the arc remains ignited depends, of course, upon the electrode spacing and the load into which it is passing. The load thus actually controls the damping and the frequency of re-ignition. Because of the periodic extinguishing of the arc it does not become firmly anchored in the glass and thus permits the glass to cool and the arc to strike in at a continually different place along the edge of the passing capacitor which is being continually moved to a new position with respect thereto. Moreover, because of the horseshoe shape characteristic of the arc, and its extremely limited period of duration, the depth of its penetration into the edge of the capacitor is safely less than that which would adversely affect the edges of the metal foil sheets.

Figure 2:
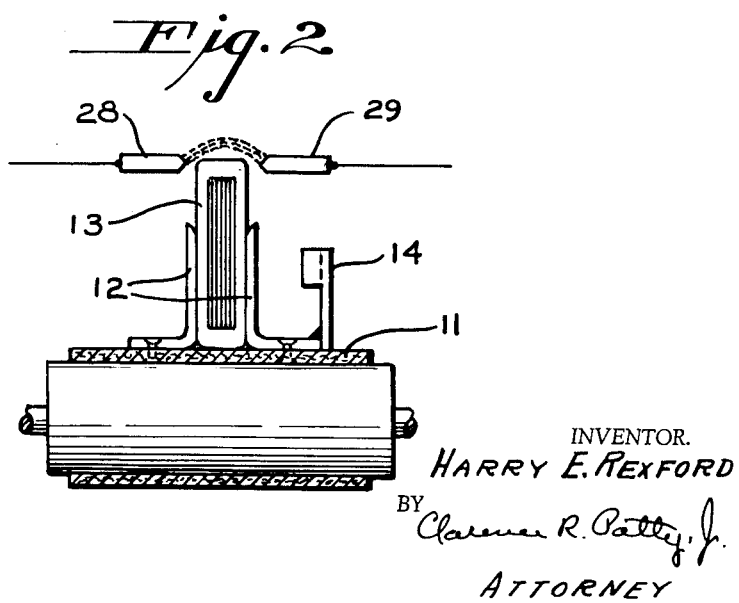

For a better understanding of the invention, reference is hereinafter made to the accompanying drawing wherein:

FIG. 1 diagrammatically shows, in plan view, a conveyor for advancing capacitors arranged with edges thereof to be sealed facing upward between a pair of electrodes, and which also shows circuits for supplying potential thereto as the capacitor is passing therebetween.
FIG. 2 is an end elevation of the structure shown in FIG. 1.

Referring to the drawing in detail, 11 designates a conveyor upon which holders such as 12 are arranged in suitably spaced relation for receipt of capacitors such as 13. Each holder is provided with a cam such as 14 for closing contact springs 15 and 16 included in an arc supply circuit to paired electrodes 28 and 29. Specifically, contact springs 15 and 16 close to establish a circuit via a conductor 18 and the primary winding 19 of a transformer T to the X terminal of a suitable alternating current supply source and via a conductor 20 and the Y terminal of such source respectively. The secondary winding 21 of transformer T is in a parallel tuned circuit including quenched gaps 22 and the primary winding 23 of an output transformer T1. To prevent radio frequency feedback into the transformer T, choke coils RFC and RFC–1 are provided. The secondary winding 24 of transformer T1 is connected to the respective electrodes 28 and 29 between which a capacitor such as 13 passes. Appropriate condensers 25 and 26 are included in the tank circuit to prevent the passage of low frequency current to the primary winding 23 of transformer T1.

In operation, a capacitor such as 13, after having been suitably preheated to an electrically conducting temperature, is advanced by the conveyor 11 in the direction indicated; and when the associated cam 14 closes contact springs 15 and 16 an arc is established between the electrodes 28 and 29 in the manner hereinbefore described. Such arc becomes extinguished periodically under the influence of the load (capacitor) as the capacitor passes therethrough at the necessary speed to appropriately form a continuous glaze along its affected edge. Obviously, the capacitor 13 is subsequently inserted and again passed between electrodes 28 and 29 to glaze its oppositely disposed edge.

What is claimed is:

1. The method of hermetically sealing, by glazing over, an edge of a fixed capacitor embodying laminations of glass and metal films bonded to one another and whose metal films terminate short of such edge, which comprises passing such edge of the capacitor as the load between electrodes spaced therefrom and in the meantime creating an arc between such electrodes from a power source of the quenched gap oscillator type, to produce an arc in horseshoe shape about such edge, and by the spacing of the electrodes and the load therebetween effecting periodic extinguishment and re-ignition of the arc as the capacitor passes between the electrodes.

2. The method of glazing the edge of a capacitor, comprising a stack of alternate layers of glass and metal foil bonded to another and wherein the edges of metal foil layers terminate short of the edge of the stack, which comprises passing the capacitor along a line near such edge between a pair of arc supply electrodes as the load therebetween, and supplying potential to said electrodes from a damped wave source to produce a horseshoe shaped arc about such edge thereof and employing the load introduced by the presence of the capacitor to cause the arc between such electrodes to periodically be extinguished and re-ignited to progressively glaze the edge surface of the capacitor as it passes between such electrodes.

References Cited in the file of this patent
UNITED STATES PATENTS

| | | |
|---|---|---|
| 1,077,733 | Meissner | Nov. 4, 1913 |
| 2,306,054 | Guyer | Dec. 22, 1942 |
| 2,422,482 | Guyer | June 17, 1947 |
| 2,526,703 | Smith | Oct. 24, 1950 |
| 2,542,066 | Varela | Feb. 20, 1951 |
| 2,642,000 | Wieking | June 16, 1953 |
| 2,902,573 | Guyer | Sept. 1, 1959 |

OTHER REFERENCES

Morecroft et al.: "Principles of Radio Communication," second edition, 1927, pages 357–361.